United States Patent [19]
Mouri et al.

[11] Patent Number: 5,337,850
[45] Date of Patent: Aug. 16, 1994

[54] REAR WHEEL STEERING CONTROL SYSTEM FOR AUTOMOTIVE VEHICLES

[75] Inventors: Hiroshi Mouri; Masayuki Watanabe, both of Yokosuka, Japan

[73] Assignee: Nissan Motor Co., Ltd., Yokohama, Japan

[21] Appl. No.: 941,224

[22] Filed: Sep. 4, 1992

[30] Foreign Application Priority Data

Sep. 4, 1991 [JP] Japan .................. 3-224295

[51] Int. Cl.$^5$ ............................. B62D 6/00
[52] U.S. Cl. .................. 180/140; 180/142; 364/424.05
[58] Field of Search ........... 180/140, 132, 141, 142, 180/143; 280/91, 99; 364/424.05, 424.01

[56] References Cited

U.S. PATENT DOCUMENTS

| | | | |
|---|---|---|---|
| 4,842,089 | 6/1989 | Kimrough et al. | 180/79.1 |
| 4,926,954 | 5/1990 | Ataka et al. | 180/140 |
| 4,971,175 | 11/1990 | Hamada | 180/140 |
| 5,186,273 | 2/1993 | Mori | 180/140 |
| 5,208,751 | 5/1993 | Berfeld | 364/425.05 |

FOREIGN PATENT DOCUMENTS

57-11173 1/1982 Japan .
60-44186 10/1985 Japan .

*Primary Examiner*—Margaret A. Focarino
*Assistant Examiner*—A. M. Boehler
*Attorney, Agent, or Firm*—Foley & Lardner

[57] ABSTRACT

A rear wheel steering control system for automotive vehicles steers rear wheels of the vehicle with a same-phase angle as the front wheels for a relatively small steering wheel operation angle, and with an opposite-phase angle to the front wheels for a relatively large steering wheel operation angle. The control system serves to mitigate an enhanced understeering tendency of front wheel drive type vehicles during cornering. A delay means is operative in a particular steering wheel operation angle range in which the rear wheels steering angle changes between a maximum same-phase steering angle and a maximum opposite-phase steering angle. The delay means sets a delayed rear wheel steering response characteristic with reference to a manual steering wheel operation, for maintaining a stable maneuverability during a lane change. When the lane change is accompanied by steer-back of the rear wheels with a same-phase angle as the front wheels, an actual cornering state of the vehicle may be detected to generate a delayed cornering state signal which is used to limit the steer-back amount.

16 Claims, 10 Drawing Sheets

FIG_5
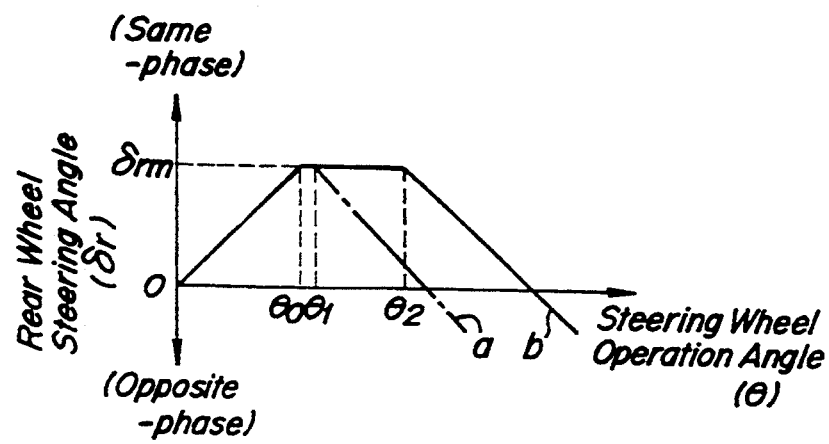
FIG_6
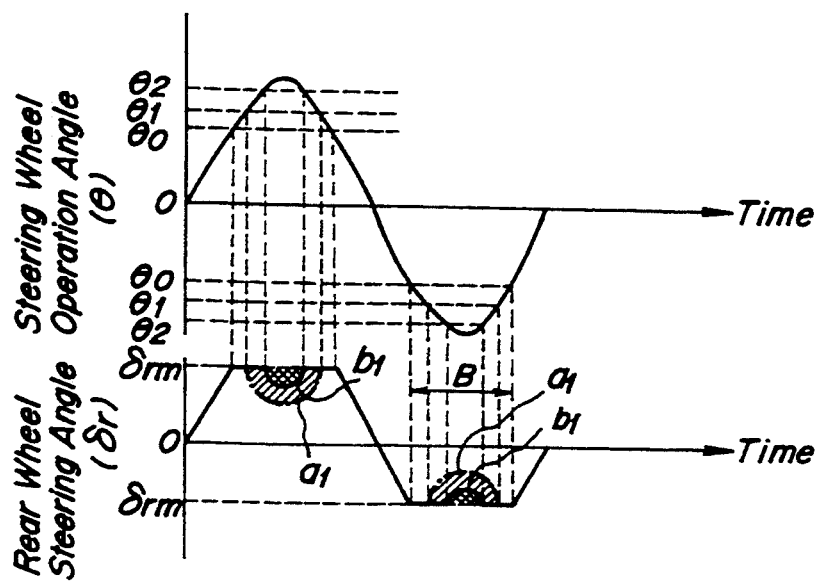

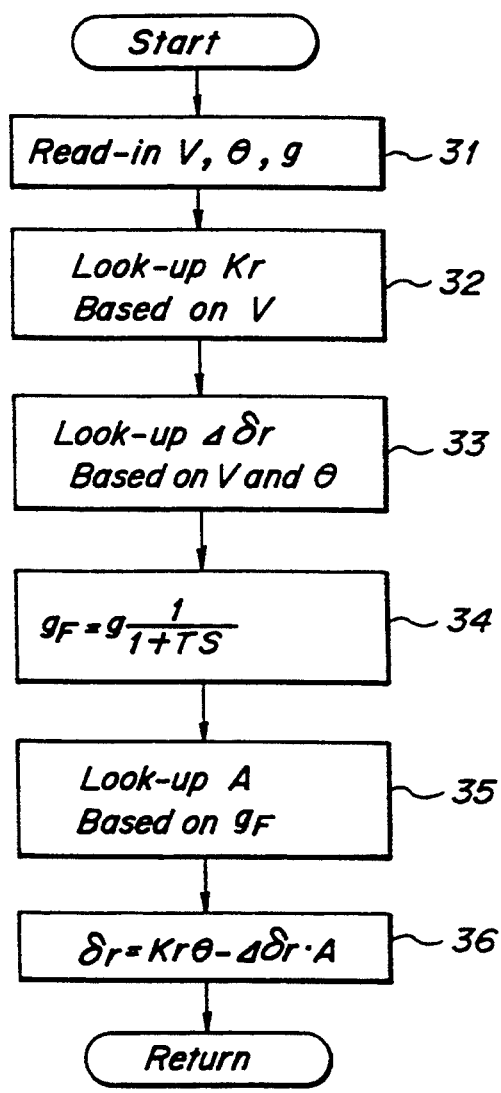
FIG_9
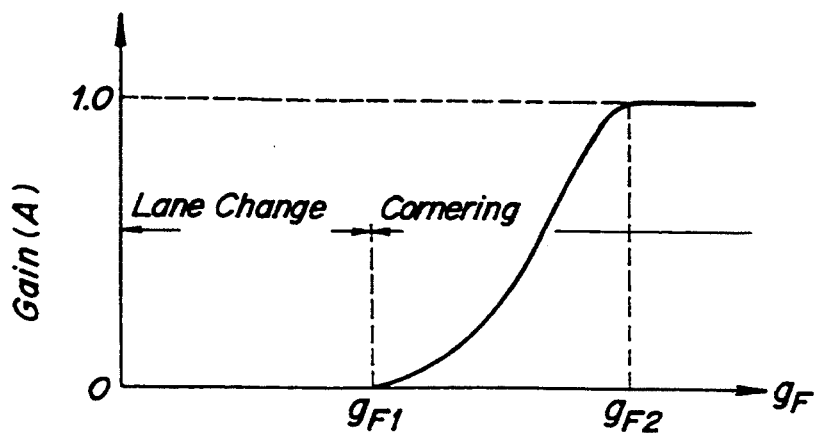
FIG_10

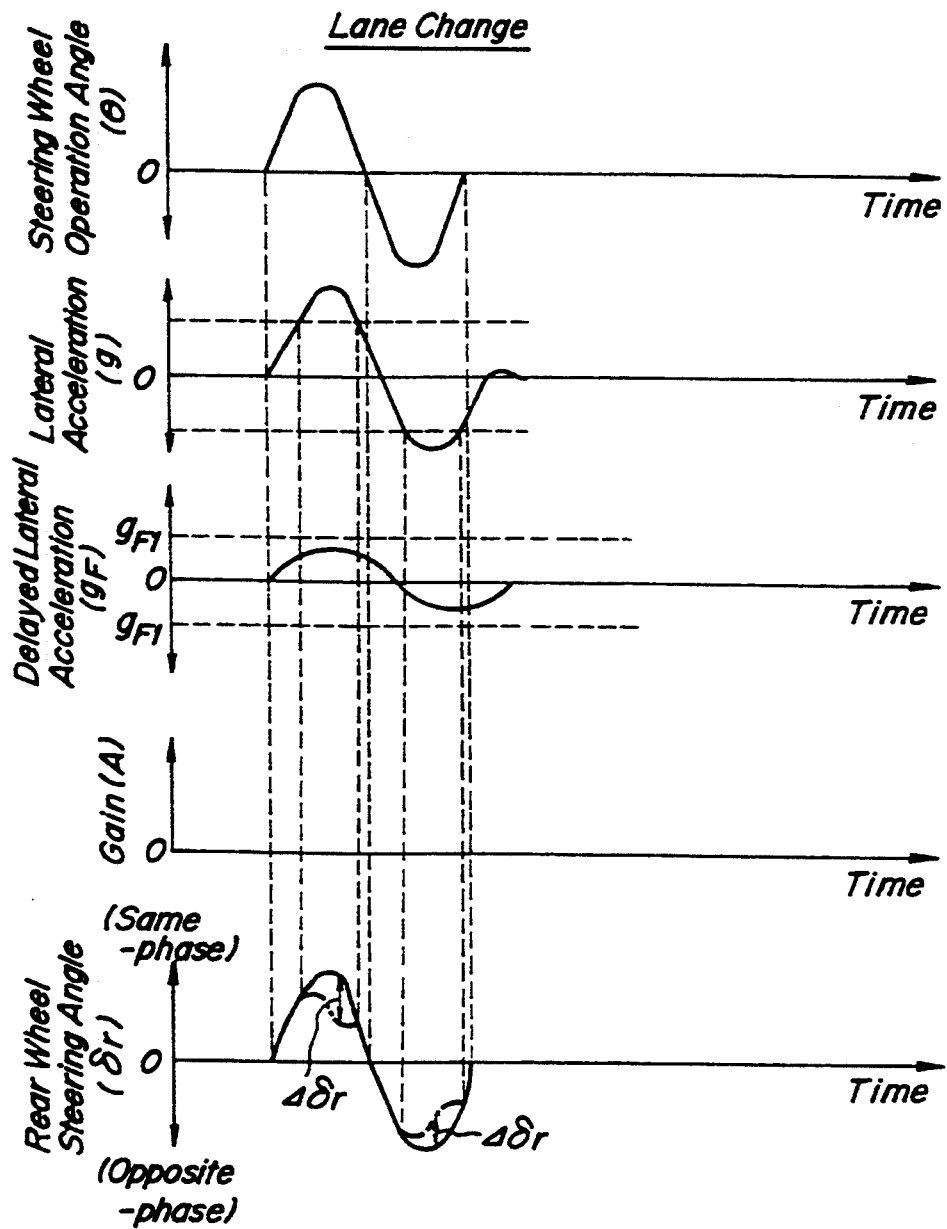
FIG_11

FIG_13
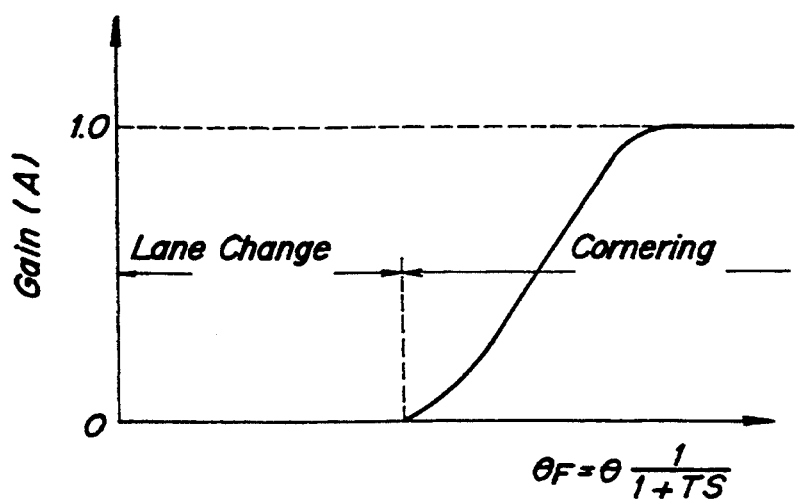
FIG_14
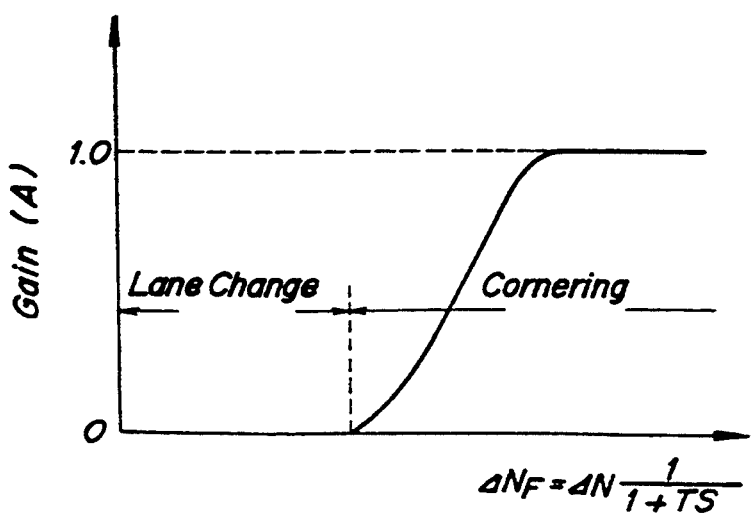

REAR WHEEL STEERING CONTROL SYSTEM FOR AUTOMOTIVE VEHICLES

BACKGROUND OF THE INVENTION

1. Field of the Invention

The present invention relates to a rear wheel steering control system for automotive vehicles, wherein rear wheels of a vehicle are steered during a main steering operation for front wheels performed by driver's manual operation of a steering wheel.

2. Description of the Prior Art

Conventionally, various types of rear wheel steering control systems are known, including a so-called steering angle responsive type as disclosed, for example, in JP-B2-60-44186. This particular type of control system is featured by such a control that, the rear wheels are steered (i) in the same-phase direction as the front wheels for a relatively small manual operation angle of the steering wheel, and (ii) in the opposite-phase direction as the rear wheels for a relatively large steering wheel operation angle.

More particularly, FIG. 5 represents typical rear wheel steering angle characteristics which can be achieved by the steering angle responsive type control system. Here, the rear steering angle $\delta_r$ assumes the maximum same-phase angle when the steering wheel manual operation angle $\theta$ is $\theta_0$. Upon further increase in the steering wheel operation angle, different rear wheel steering angle characteristics are selectively achieved depending upon whether the same-phase rear wheel steering angle begins to decrease toward the opposite-phase angle either at an increased steering wheel operation angle $\theta_1$ (the solid line a in FIG. 5), or at a further increased steering wheel operation angle $\theta_2$ (the imaginary line b in FIG. 5). For the sake of convenience, the rear wheels steering characteristics as represented by the solid line and the imaginary line in FIG. 5 may be referred to hereinafter, as "characteristic a" and "characteristic b" respectively.

Another type of rear wheel steering control system is disclosed, for example, in JP-A-57-11173 which is a so-called vehicle speed responsive type. Basically, this type of system is to perform the rear wheel steering so as to achieve a ratio $K_r(=\delta_r/\theta)$ as shown in FIG. 7, of the rear wheel steering angle $\delta_r$ in relation to the steering wheel operation angle $\theta$ which represents the front wheel steering angle $\delta_f$. Thus, as a function of an actual vehicle speed V and with reference to the front wheel steering angle, the rear wheels are steered with an opposite-phase angle in a low speed range ($V<V_0$) and with a same-phase angle in a high speed range ($V \geq V_0$).

As known in the art, front wheel drive type vehicles generally exhibit an understeering tendency which is particularly significant in a higher speed range wherein the vehicle body is subjected to a higher magnitude of lateral acceleration. A same-phase steering of the rear wheels in a high speed range $V \geq V_0$ often results in an enhanced understeering tendency of the front wheel drive type vehicles, thereby significantly deteriorating the maneuverability characteristics of the vehicle. Thus, in the case of front wheel drive type vehicles, some drivers may operate the steering wheel by an increased operation angle $\theta$, corresponding to the enhanced understeering tendency for the same-phase steering region in the high speed range $V \geq V_0$.

With this in mind, one approach to mitigate the enhanced understeering tendency may be to steer back the rear wheels toward the opposite-phase angle. This is achieved by setting a predetermined rear wheel steer-back angle $\Delta\delta_r$ which assumes an incremental amount with increase in the steering wheel operation angle $\theta$ in a large steering wheel operation angle range, and also with increase in the vehicle speed V, both corresponding to increase in lateral acceleration of the vehicle. The steer-back angle $\Delta\delta_r$ determines the rear wheels steering angle $\delta_r$, as $\delta_r = K_r\theta - \Delta\delta_r$.

The above-mentioned steering angle responsive type control system has either one of the characteristics a and b shown in FIG. 5, which has already been selected during the design stage, and the vehicle speed responsive type control system has one definite characteristic. Thus, these prior art systems may encounter the following problems.

There is shown in FIG. 6 different modes of the rear wheel steering angle variation upon a lane-change steering wheel operation with an operation angle $\theta$ which is variable with time as shown, respectively for the rear wheel steering angle characteristics a and b as explained with reference to FIG. 5. Here, the variations $a_1$ and $b_1$ correspond to the characteristics a and b, respectively. The hatched regions in FIG. 6 are regions wherein the steering wheel operation angle $\theta$ is in excess of respectively predetermined criteria $\theta_1$, $\theta_2$ so that the same-phase rear steering angle is reduced from the maximum angle $\delta_{rm}$, or the rear wheel steering is changed from the same-phase steering toward the opposite-phase steering.

The presence of such hatched regions in FIG. 6 means that, upon manual steering back during a steering wheel operation for changing the lane, rear wheels are steered so that the same-phase steering angle is instantaneously once reduced from the maximum angle $\delta_{rm}$ and then increased to the maximum angle $\delta_{rm}$ again. In this sense, insofar as the lane change of the vehicle is concerned, the rear wheel steering characteristic b is generally considered superior to the characteristic a, because of a smaller hatched region $b_1$ in FIG. 6.

From another viewpoint, however, the rear wheel steering characteristic b tends to give rise to a difficulty during a cornering of a vehicle, in particular during a high speed cornering, in effectively mitigating the above-mentioned enhanced understeering tendency of front wheel drive type vehicles. Such a difficulty is considered due to the smaller hatched region of the same-phase rear wheel steering characteristic variation as shown at $b_1$, and hence due to a reduction of the same-phase rear wheel steering angle from the maximum angle $\delta_{rm}$ at a retarded timing and with a poor reduction amount. As the case may be, it becomes almost impossible to mitigate the enhanced understeering tendency of front wheel drive type vehicles, due to the ground which will be explained below.

That is to say, in the case of the rear wheel steering characteristic b, the same-phase rear steering angle is maintained at the maximum angle $\delta_{rm}$ for a relatively long period so that a cornering characteristic of the vehicle, which is comparable with that for the rear wheel steering characteristic a, can be achieved only with the driver's manual operation of the steering wheel by an increased angle, and this is usually the case. However, front wheel drive type vehicles tend to exhibit enhanced understeering tendency during a high speed cornering, and undergoes understeering before the steering wheel is operated by an angle $\theta_2$ where the same-phase rear steering angle begins to be reduced from the maximum angle $\delta_{rm}$. On such occasion, the driver feels a reduced front wheel cornering power, or an increased cornering radius, and refrains from further increasing the steering wheel operation angle $\theta$. As a result, the driver's manual steering wheel operation is actually performed within a range of $\theta < \theta_2$, as shown in FIG. 6, and it is impossible to mitigate the enhanced understeering within a range of $\theta \geq \theta_2$. In this sense, insofar as the cornering of the vehicle is concerned, the rear wheel steering characteristic a is generally considered superior to the characteristic b, because of a larger rear wheel steering angle variation of the hatched region a1 in FIG. 6.

With the conventional rear wheel steering control systems as discussed above, due to a single kind of fixed rear wheel steering angle characteristic as determined in the design stage, both the characteristic demand for the lane change of the vehicle and that for the cornering of the vehicle could not be satisfied on compatible basis, and either one of the demand could be satisfied with the sacrifice of the other.

With the vehicle speed responsive type rear wheel steering control system, moreover, the rear wheel steering angle is basically determined to have a characteristic as shown in FIG. 7, and is modified in the direction of reduced same-phase steering angle (or increased opposite-phase steering angle) by an amount $\Delta\delta_r$ as shown in FIG. 8. This gives rise to a problem that the rear wheel steering angle variation with the steer-back amount $\Delta\delta_r$ degrades a desired stable maneuverability of the vehicle particularly during a lane change wherein the steering wheel is rapidly operated. On the other hand, an excessively small steer-back amount $\Delta\delta_r$ would not permit an intended mitigation of an enhanced understeering of front wheel drive vehicles to be satisfactorily achieved during a lane change.

SUMMARY OF THE INVENTION

It is a primary object of the present invention to provide an improved rear wheel steering control system, which is capable of satisfying both the characteristic demand for the lane change of the vehicle and that for the cornering of the vehicle on a compatible basis.

It is a specific object of the present invention to provide an improved rear wheel steering control system, which is of a steering angle responsive type, and is capable of satisfying the characteristic demand for a lane change wherein the steering wheel is rapidly operated, and effectively mitigating an enhanced understeering of front wheel drive vehicles during a cornering wherein the steering wheel is slowly operated.

It is another specific object of the present invention to provide an improved rear wheel steering control system, which is of a steering angle responsive type, and is capable of maintaining a stable maneuverability of the vehicle during a lane change, and effectively mitigating an enhanced understeering of front wheel drive vehicles during a cornering of the vehicle.

The present invention is applicable to a rear wheel steering control system for automotive vehicles including front wheels, rear wheels, and a steering wheel which can be manually operated to steer the front wheels, said control system comprising means for steering the rear wheels in accordance with a steering wheel operation angle, with a same-phase as the front wheels for a relatively small steering wheel operation angle, and with an opposite-phase to the front wheels for a relatively large steering wheel operation angle, said control system having a predetermined steering wheel operation angle range in which the steering angle of the rear wheels changes between a maximum same-phase steering angle and a maximum opposite-phase steering angle. According to a first aspect of the present invention, the control system comprises delay means operative in the above-mentioned particular steering wheel operation angle range, for setting a retarded response characteristic of the rear wheel steering, which is delayed with reference to a manual steering wheel operation.

The present invention is also applicable to a rear wheel steering control system for automotive vehicles including front wheels, rear wheels, and a steering wheel which can be manually operated to steer the front wheels, said control system comprising means for steering the rear wheels with a same-phase as the front wheels for a relatively small steering wheel operation angle in a predetermined operation range, and means for steering-back the rear wheels in said operation range, toward an opposite phase direction with reference to the front wheels. According to a second aspect of the present invention, the control system comprises: detecting means for detecting a cornering state of the vehicle and generating an actual cornering state signal indicative of an actual cornering state of the vehicle; delay means connected to said detecting means and responsive to said actual cornering state signal, for generating a delayed cornering state signal which is delayed with reference to said actual cornering state signal; and rear wheel steer-back limiting means connected to said delay means and responsive to said delayed cornering state signal, for limiting the rear wheels steering-back in accordance with said delayed cornering state signal.

With the control system of the present invention in its first aspect, during a steering of the front wheels as performed by driver's manual operation of the steering wheel, the rear wheels are steered in accordance with the operation angle of the steering wheel, with a same-phase angle as the front wheels for a relatively small steering wheel operation angle, and with an opposite-phase angle to the front wheels for a relatively large steering wheel operation angle.

Further, in the predetermined steering wheel operation angle range in which the steering angle of the rear wheels changes between the maximum same-phase steering angle and the maximum opposite-phase steering angle, the delay means causes the rear wheel steering to be performed with a retarded response characteristic which is delayed with reference to the manual steering wheel operation. Thus, in the case of a lane change, for example, wherein a rapid change in operation angle of the steering wheel is maintained, even upon a manual steering-back within the operation angle range in which the rear wheels are steered with the maximum same-phase steering angle, it is possible to avoid occurrence of such a rear wheel steering angle variation that the same-phase steering angle is once instantaneously reduced from the maximum angle and then increased to the maximum angle again. Thus, the present invention serves to effectively avoid degradation of the maneuverability of the vehicle during the lane change, etc.

On the other hand, during a cornering of the vehicle wherein the steering wheel is operated slowly, the steering wheel operation is performed far more slowly as compared with the delay time as set by the delay means so that the rear wheel steering angle is controlled as if there were no delay means. Therefore, upon the steering-back operation of the steering wheel, the rear wheels are steered with such a steering angle variation that the same-phase steering angle is reduced from the maximum angle and then increased to the maximum angle once again. The rear wheel steering angle variation depends upon the rear wheel steering angle characteristic with reference to the steering wheel operation angle, and can be determined independently of the characteristic demand for the lane change in a relatively unrestricted sense. Thus, the cornering characteristic demands of the vehicle can be satisfied by an optimum determination of the rear wheel steering angle variation during the cornering of the vehicle, e.g., so as to mitigate enhanced understeering tendency of front wheel drive type vehicles during the cornering.

The present invention is therefore capable of maintaining a stable maneuverability of the vehicle during the lane change, and effectively mitigating enhanced understeering tendency of front wheel drive vehicles during cornering, on a compatible basis.

With the control system of the present invention in its second aspect, when the front wheels are steered by manual operation of the steering wheel within the predetermined operation range wherein the rear wheels are steered with a same-phase angle as the front wheels, the rear wheels are steered-back toward an opposite phase direction with reference to the front wheels, in accordance with the steering wheel operation angle. Such steering-back of the rear wheels makes it possible to mitigate the enhanced understeering tendency of the front wheel drive type vehicles, which takes place upon the same-phase steering of the rear wheels during cornering of the vehicle.

On the other hand, the detecting means serves to detect the cornering state of the vehicle and generates an actual cornering state signal which is indicative of an actual cornering state of the vehicle. The delay means is connected to the detecting means and responds to the actual cornering state signal for generating a delayed cornering state signal which is delayed with reference to the actual cornering state signal. The rear wheel steer-back limiting means is connected to the delay means and responds to the delayed cornering state signal for limiting the rear wheels steering-back in accordance with the delayed cornering state signal. The delayed cornering state signal is significantly delayed with reference to the actual cornering state signal, during a lane change wherein the cornering state varies rapidly. Therefore, the steering-back amount of the rear wheels is significantly limited during the lane change, etc., to effectively prevent the maneuverability of the vehicle from becoming unstable as a result of the steer-back of the rear wheels.

Furthermore, during a cornering of vehicles wherein the cornering state varies slowly, the delayed cornering state signal is substantially the same as the actual cornering state signal and does not essentially limit the steering-back amount of the rear wheels, to thereby maintain the desired function of mitigating the enhanced understeering tendency of the front wheel drive type vehicles, during the same-phase steering of the rear wheels.

BRIEF DESCRIPTION OF THE DRAWINGS

The present invention will be explained in further detail hereinafter, with reference to certain preferred embodiments shown in the accompanying drawings, wherein:

FIG. 5 is a graph showing two examples of the rear wheel steering angle characteristic achieved by a conventional proportional control of the rear wheel steering angle with reference to the steering wheel operation angle;

FIG. 6 is a graph showing one example of variation of the rear wheel steering angle as controlled in a conventional manner with the characteristics shown in FIG. 5;

FIG. 9 is a flow chart showing another example of a control program which can be executed in accordance with the present invention to determine the rear wheel steering angle, to be used in combination with the rear wheel steering angle characteristic as shown in FIG. 7;

FIG. 10 is a graph showing one example of variation of the gain as used in the control program of FIG. 9;

FIG. 11 is a time chart showing the function of the control in accordance with FIG. 9, as related to a relatively rapid operation of the steering wheel;

FIG. 13 is a graph similar to FIG. 10, showing another example of variation of the gain; and FIG. 14 is a graph similar to FIG. 10, showing still another example of variation of the gain.

DETAILED DESCRIPTION OF THE PREFERRED EMBODIMENT

Figure 1:
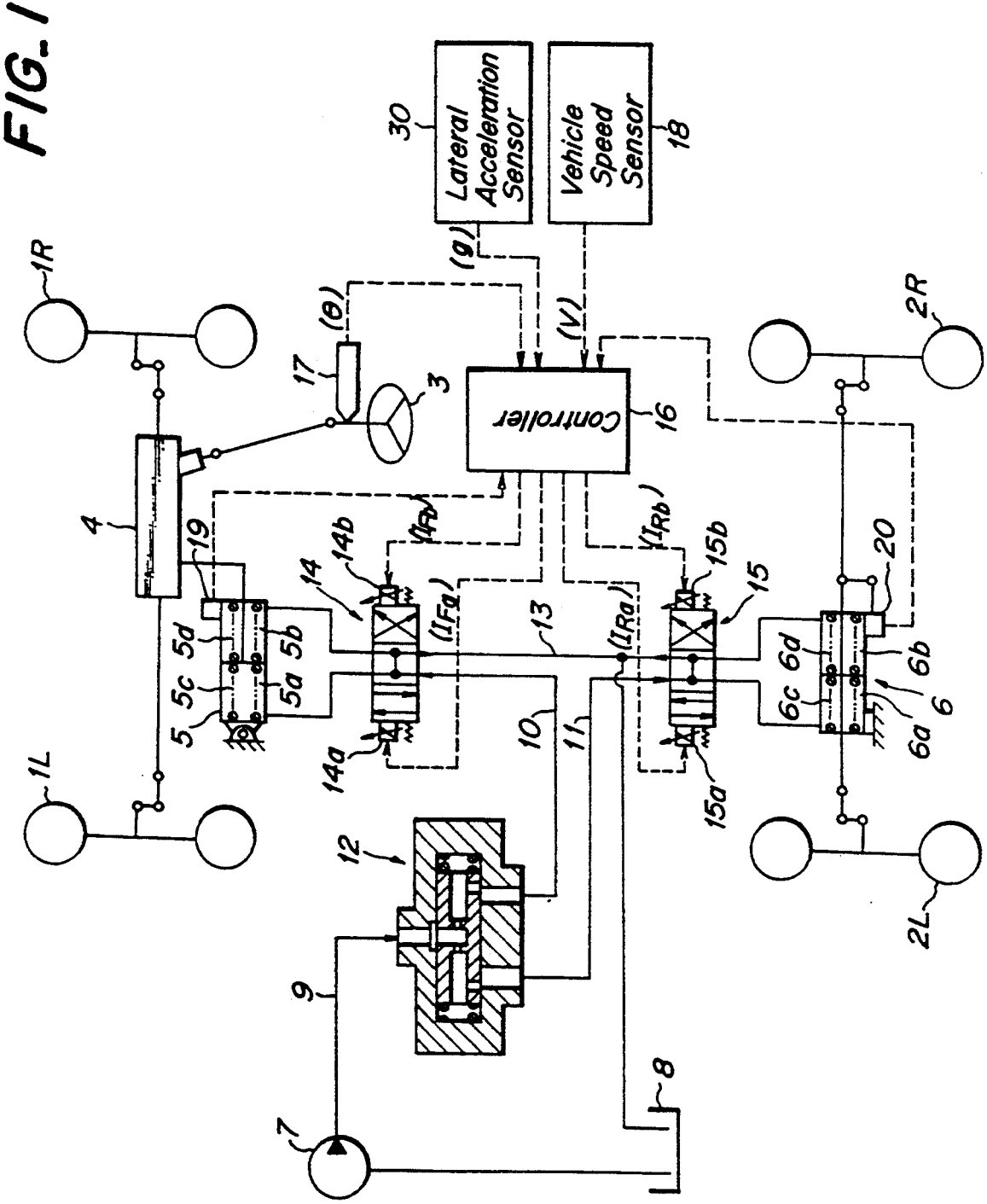
FIG. 1 is a diagram showing the rear wheel steering control system of an automotive vehicle, to which the present invention may be applied.

Referring now to FIG. 1, there is shown a system diagram of the rear wheel steering control system for a four wheel steering (4WS) vehicles, to which the present invention may be applied. The vehicle includes left and right front wheels 1L, 1R, and left and right rear wheels 2L, 2R. The front wheels 1L, 1R are steered by a manually operable steering wheel 3 through a steering gear assembly 4 in a manner known, per se. Besides, the front wheels 1L, 1R can be subjected to an auxiliary steering wherein they are steered by an incremental amount or decremental amount, by shifting the casing for the steering gear assembly 4 in the widthwise direction of the vehicle by means of an actuator 5. The rear wheels 2L, 2R, in turn, can be steered by means of another actuator 6. The auxiliary steering of the front wheels 1L, 1R and the steering of the rear wheels 2L, 2R are both electronically controlled based on the control system to be explained hereinafter.

The control system is associated with a hydraulic circuit which includes an oil pump 7 as a common pressure source. The pump 7 sucks oil from a reservoir 8 and discharges pressurized oil to a main passage 9 which is connected to branch passages 10, 11. The branch passage 10 forms an auxiliary steering control circuit for the front wheels 1L, 1R, and the branch passage 10 forms a steering control circuit for the rear wheels 2L, 2R. A branch valve 12 is interposed between the main passage 9 and the branch passages 10, 11. The oil which has been used in the auxiliary steering control circuit and/or the steering control circuit 12 is returned to the reservoir 8 through a drain passage 13.

A control valve 14 is interposed between the actuator 5 and the passages 10, 13, for controlling the auxiliary steering angle of the front wheels 1L, 1R. Another control valve 15 is interposed between the actuator 6 and the passages 11, 13, for controlling the steering angle of the front wheels 2L, 2R.

The control valve 14 includes solenoids 14a, 14b and maintains the connection of the hydraulic passages as illustrated in FIG. 1, in the OFF state of the solenoids 14a, 14b. Thus, the entire amount of oil from the passage 10 is returned to the passage 13 so that both pressure chambers 5a, 5b of the actuator 5 are kept unpressurized. The actuator 5 is thus maintained in its neutral position by springs 5a, 5b, so that the steering gear assembly 4 is kept in a position where the front wheels 1L, 1R are not subjected to an auxiliary steering control. When the solenoid 14a is supplied with electric current IFa and energized into ON state, the pressure chamber 5a is applied with a pressure which is proportional to the magnitude of the current $I_{Fa}$, whereas the pressure chamber 5b is drained. As a result, the actuator 5 is caused to extend so that the casing of the steering gear assembly 4 is moved toward right in FIG. 1. This means that the front wheels 1L, 1R are subjected to an auxiliary steering toward left, with a steering angle which is in accordance with the pressure level within the pressure chamber 5a. On the other hand, when the solenoid 14b is supplied with electric current IFb and energized into ON state, the pressure chamber 5b is applied with a pressure which is proportional to the magnitude of the current $I_{Fb}$, whereas the pressure chamber 5a is drained. As a result, the actuator 5 is caused to contract so that the casing of the steering gear assembly 4 is moved toward left in FIG. 1. This means that the front wheels 1L, 1R are subjected to an auxiliary steering toward right, with a steering angle which is in accordance with the pressure level within the pressure chamber 5b.

The control valve 15 for controlling the rear wheel steering and the actuator 6 associated therewith are constructed and operated essentially in the same manner as the control valve 14 and the actuator 5, respectively. Thus, the elements of the control valve 15 and the actuator 6 corresponding to those of the control valve 14 and the actuator 5 are represented by similar reference numerals 15a, 15b and 6a-6d, respectively, in order to omit superfluous description for the sake of simplicity.

The control system shown in FIG. 1 further includes a controller 16 which serves to control the solenoids 14a, 14b, 15a, 15b and the magnitude of electric current $I_{Fa}$, $I_{Fb}$, $I_{Ra}$, $I_{Rb}$ supplied thereto. The controller 16 has input terminals which are connected to various sensors, e.g., a steering angle sensor 17 for generating a signal which is indicative of the steering wheel operation angle $\theta$ (front wheel main steering angle), a vehicle speed sensor 18 for generating a signal indicative of the vehicle speed V, a lateral acceleration sensor 30 for generating a signal indicative of a lateral acceleration g applied to the vehicle. Based upon signals from these sensors, the controller 16 executes a predetermined control program to operate and determine the aimed values for the front wheel auxiliary steering angle $\delta_f$ and the rear wheel steering angle $\delta_r$. The controller 16 has further input terminals which are connected to stroke sensors 19, 20 for detecting the stroke of the actuators 5, 6 and hence the front wheel auxiliary steering angle and the rear wheel steering angle, respectively. The signals from the stroke sensors 19, 20 are supplied to the controller 16 as feed-back signals, to perform ON-OFF control the solenoids 14a, 14b, 15a, 15b of the control valves 14, 15, and further to control the magnitude of the electric current $I_{Fa}$, $I_{Fb}$, $I_{Ra}$, $I_{Rb}$ to be supplied to the solenoids 14a, 14b, 15a, 15b.

Figure 2:
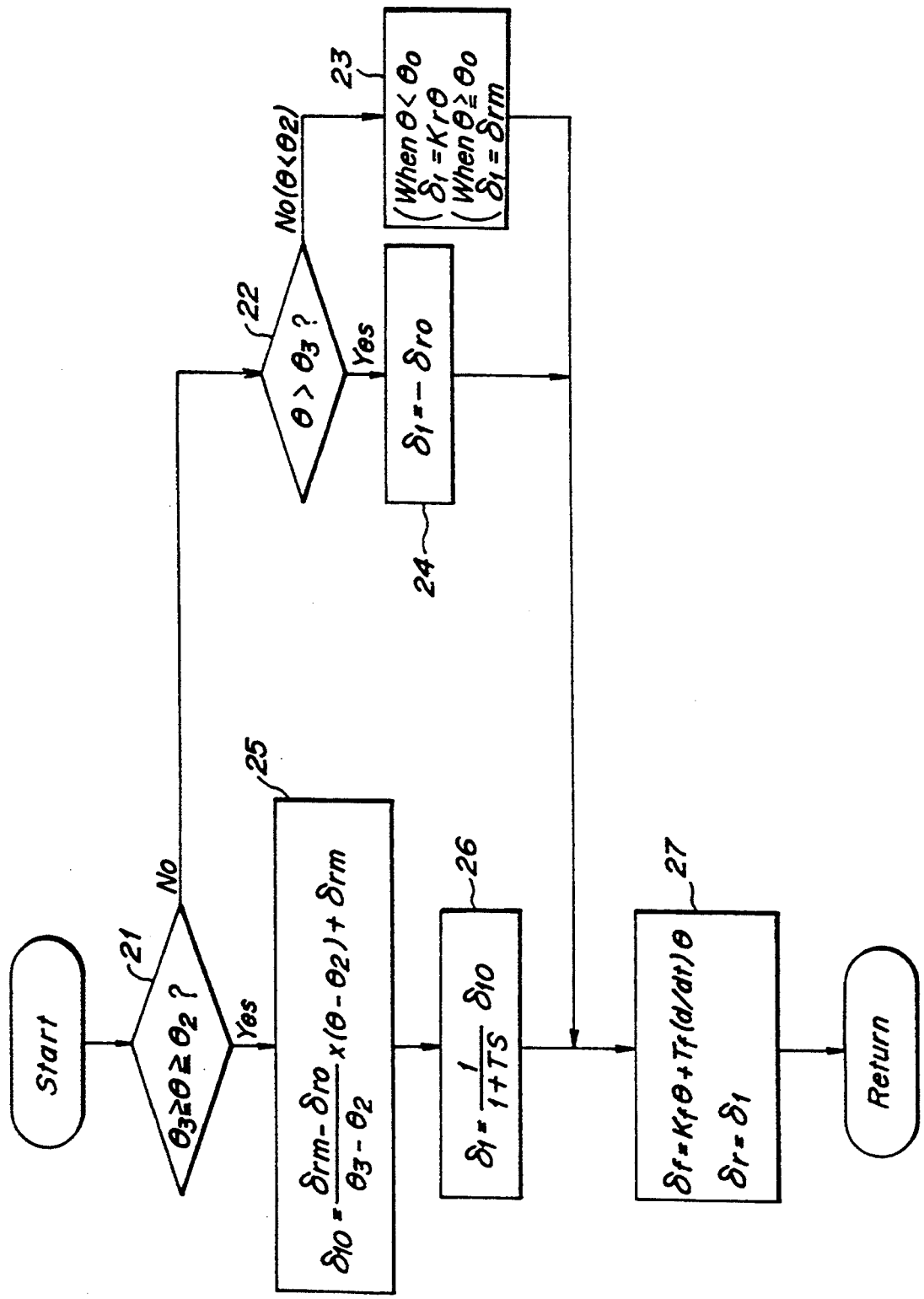
FIG. 2 is a flow chart showing one example of a control program which can be executed in accordance with the present invention to determine the rear wheel steering angle.

The manner of operation for determining the aimed values for the front wheel auxiliary steering angle $\delta_f$ and the rear wheel steering angle $\delta_r$ will be explained below. For this operation, the controller 16 executes the control program as shown in FIG. 2. Since, however, the front wheel auxiliary steering is not directly the subject of the present invention, as shown at step 27, it is assumed here that the aimed value for the front wheel auxiliary steering angle $\delta_f$ is determined in a conventional manner, based on the following operational formula:

$$\delta_f = K_F \theta + T_F (d/dt)\theta$$

wherein $K_f$ is a proportional constant dependent upon the vehicle speed V, and $T_f$ is a differential constant also dependent upon the vehicle speed V. In this formula, the first and second terms on the right side are respectively proportional term and differential term. During a transitional steering period wherein the steering wheel operation angle $\theta$ is relatively small and its variation rate $(d/dt)\theta$ is relatively large, the differential term plays a decisive role to achieve an improved initial turning characteristic. During a subsequent continuous steering period wherein the steering wheel operation angle $\theta$ is relatively large and its variation rate $(d/dt)\theta$ is relatively small, the proportional term plays a decisive role to achieve an effectively stabilized maneuverability.

The aimed value for the rear wheel steering angle $\delta_r$ may be determined in a similar manner, using an operational formula including a proportional term and a differential term. Since, however, the differential term is not directly related to the present invention, as shown at the step 27, the rear wheel steering angle $\delta_r$ is assumed to be $\delta_1$ which takes only a proportional term into consideration for the sake of simplicity. With the objectives of the present invention in view, thus assumed rear wheel steering angle $\delta_1$ is determined as follows.

In the present example, the following explanation is given with an assumption that the rear wheel steering angle characteristic of the proportional term, i.e., the characteristic of the rear wheel steering angle $\delta_r$ with reference to the steering wheel operation angle $\theta$, which is required to mitigate an enhanced understeering tendency of a front wheel drive vehicle during cornering wherein the steering wheel is relatively slowly operated as mentioned above, is such as that shown in FIG. 3.

Figure 3:
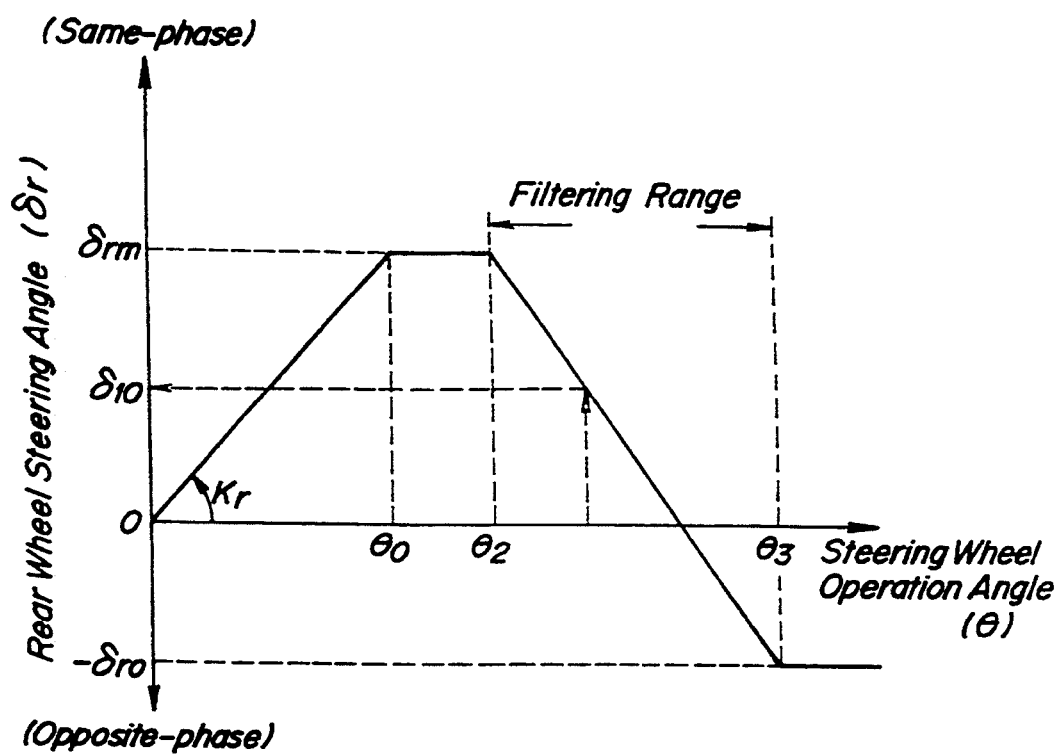
FIG. 3 is a graph showing the rear wheel steering angle characteristic which is suitable for the control during a cornering of a vehicle.

As particularly shown in FIG. 3, in a range of the steering wheel operation angle $\theta$ between zero (neutral) and a criterion angle $\theta_0$, the rear wheel steering angle $\delta_r$ increases in the direction of same-phase angle with a gradient $K_r$ which is basically a proportional constant depending upon the steering wheel operation angle $\theta$, but which is variable depending upon the vehicle speed V. Furthermore, the rear wheel steering angle $\delta_r$ is maintained at the maximum same-phase angle $\delta_{rm}$ in the steering wheel operation angle range of $\theta_0 < \theta < \theta_2$, is reduced from the maximum same-phase angle $\delta_{rm}$ toward the maximum opposite-phase angle $-\delta_{r0}$ in the steering wheel operation angle range of $\theta_2 < \theta < \theta_3$, and is maintained at the maximum opposite-phase angle $-\delta_{r0}$ in the steering wheel operation angle range of $\theta > \theta_3$.

Preferably, the steering wheel operation criterion angle $\theta_2$ is dependent upon the vehicle speed V and decreases as the vehicle speed V becomes higher. This is because the understeering tendency during a cornering of the vehicle is induced even with a smaller steering wheel operation angle $\theta$ in the case of a higher vehicle speed.

Thus, as shown in FIG. 2, a determination is made in steps 21, 22 to determine with which one of the angular ranges $\theta_3 > \theta > \theta_2$, $\theta > \theta_3$ and $\theta < \theta_2$ the steering wheel is being operated. If the so-determined steering wheel operation angular range is $\theta < \theta_2$, the rear wheel steering angle $\delta_1$ is set in a subsequent step 23 as $\delta_1 = K_r \theta$ for $\theta < \theta_0$, and as $\delta_1 = \delta_{rm}$ for $\theta > \theta_0$, which is used in a step 27 to determine the aimed value for the rear wheel steering angle $\delta_r$.

Finally, if the steering wheel operation angle $\theta$ is determined to be within the range of $\theta_3 > \theta > \theta_2$, the rear wheel steering angle $\delta_{10}$ in this range in FIG. 3 is determined at a step 25 as:

$$\delta_{10} = \{(\delta_{rm} - \delta_{r0})/(\theta_3 - \theta_2)\} \times (\theta - \theta_2) + \delta_{rm}$$

However, in order to achieve the objective of the present invention, the angle $\delta_{10}$ in this range is not directly used as the rear wheel steering angle $\delta_1$. Rather, the rear wheel steering angle $\delta_1$ is obtained at a subsequent step 26 by applying a delay to the angle $\delta_{10}$ by means of a first order delay element, which is also used in the step 27 to determine the aimed value for the rear wheel steering angle $\delta_r$.

In setting the above-mentioned first order delay at the step 26, i.e., a response delay of the rear wheel steering angle with reference to the steering wheel operation, the rear wheel steering angle $\delta_1$ is given as:

$$\delta_1 = \{1/(1+TS)\}\delta_{10}$$

wherein T is a first order delay time constant, and S is a differential operator. In view of the objective of the present invention, the time constant T is determined to be a value which is effective to a high speed steering with a frequency of 1 Hz or more which substantially corresponds to a steering frequency during a lane change. Thus, for example, assuming that the stability in maneuverability of the vehicle is adversely influenced during a lane change for a period of 0.25 sec., as shown at B in FIG. 6, it is preferable to set the time constant T as 250 msec. or more. It is of course, that the time constant has to be tuned with reference to the angles $\theta_1$, $\theta_2$ in FIG. 6 which vary depending upon different specifications of vehicles.

Figure 4A:
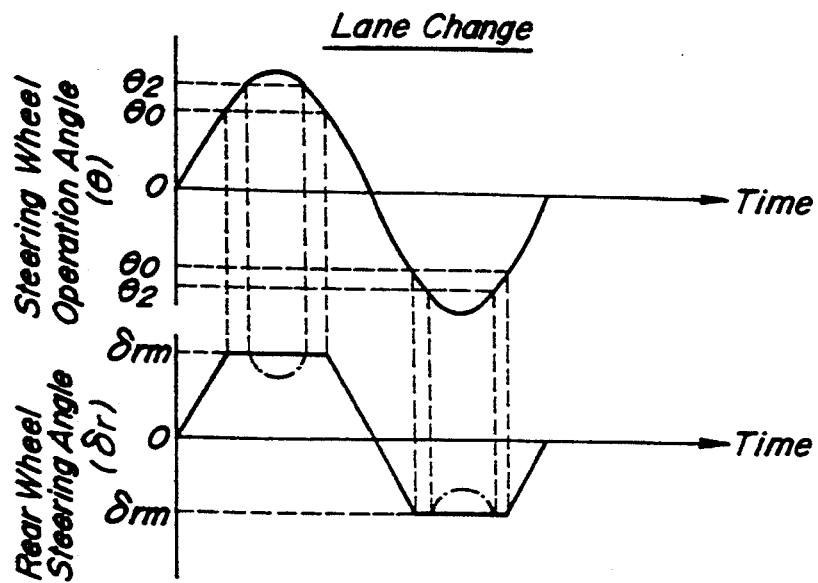
FIGS. 4(a) and 4(b) are time charts showing the variation of the rear wheel steering angle for relatively rapid operation and relatively slow operation of the steering wheel.
Figure 4B:
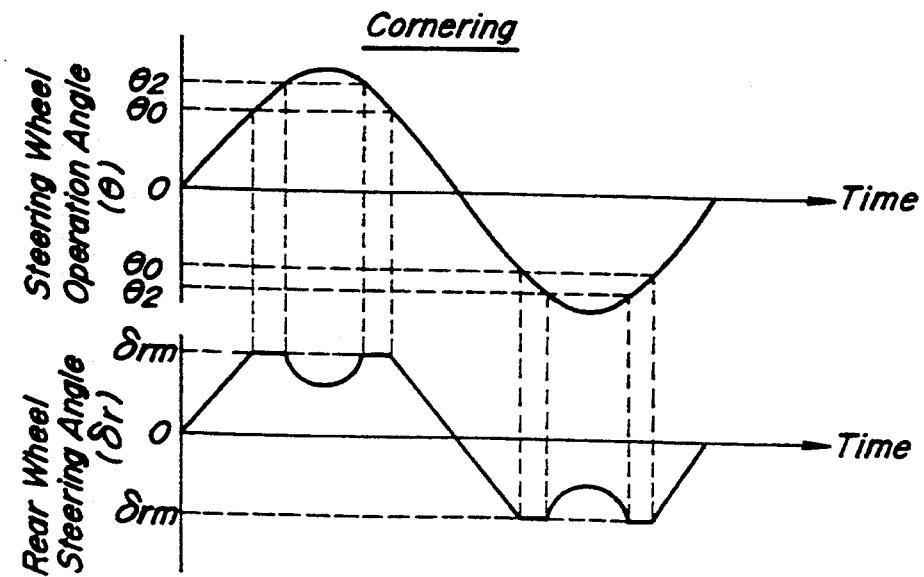

FIGS. 4(a) and 4(b) are time charts showing the variation of the rear wheel steering angle $\delta_r$, in the case of the rear wheel steering angle characteristic as shown in FIG. 3, as being applied with a first order delay element at the step 26 in FIG. 2.

As shown in FIG. 4(a), during a lane change of the vehicle wherein the steering wheel operation angle is varied relatively rapidly, the absence of the first order delay element results in undesired degradation in stability of the vehicle maneuverability since, in the course of a steer-back operation of the steering wheel, the rear wheel steering angle is once reduced from the same-phase maximum steering angle $\delta_{rm}$ as shown by an imaginary line. The provision of the first order delay element makes it possible to realize a smooth variation of the rear wheel steering angle as shown by a solid line in FIG. 4(a) and thereby eliminate the unstability in the maneuverability of the vehicle.

Furthermore, as shown in FIG. 4(b), during a cornering of the vehicle wherein the steering wheel is operated relatively slowly, due to the above-mentioned setting of the time constant T, the first order delay element is substantially out of its function and does not play a role in determining the rear wheel steering angle. That is, since $\delta_1 = \delta_{10}$ in the step 26 in FIG. 2, the rear wheel steering angle $\delta_r$ is once reduced from the same-phase maximum steering angle $\delta_{rm}$ in the course of a steer-back operation of the steering wheel, so as to mitigate an enhanced understeering tendency of front wheel drive type vehicles during the cornering.

The rear wheel steering control system as shown in FIG. 1 may have a rear wheel steering characteristic as explained above with reference to FIGS. 7 and 8. In this instance, with the above-mentioned objective of the present invention in view, the controller 16 may determine the rear wheel steering angle $\delta_r$ by a control program as shown in FIG. 9, which will be explained below.

Figure 7:
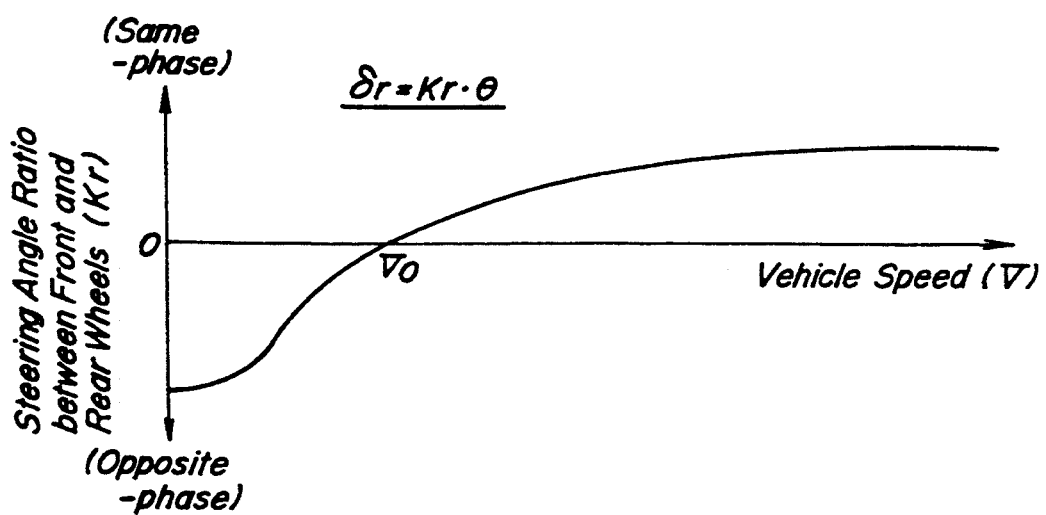
FIG. 7 is a graph showing one example of the rear wheel steering angle characteristic which may be applicable to the present invention.
Figure 8:
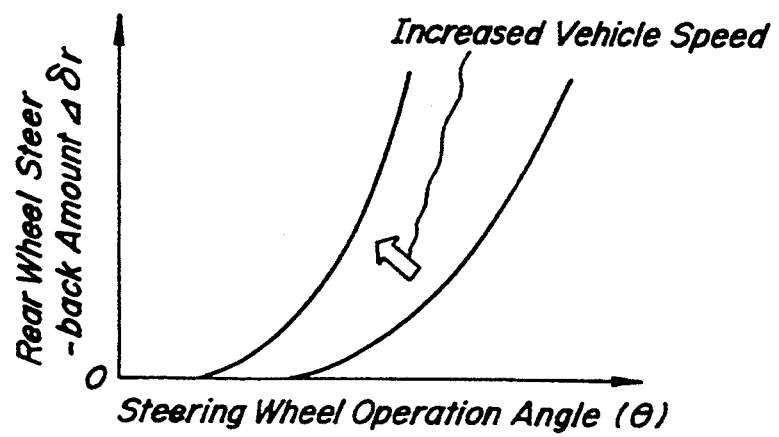
FIG. 8 is a graph showing one example of the rear wheel steer-back characteristic which may be used in combination with the rear wheel steering angle characteristic shown in FIG. 7.

First of all, in a step 31, the vehicle speed V, the steering wheel operation angle $\theta$ and the lateral acceleration g are respectively read-in. Subsequently, the proportional constant Kr in FIG. 7 is looked-up in a step 32 based on the vehicle speed V, and the rear wheel steer-back amount $\Delta\delta_r$ in FIG. 8 is looked-up in a step 33 based on the vehicle speed V and the steering wheel operation angle $\theta$. In a subsequent step 34, the signal indicative of the lateral acceleration g (actual cornering state signal) is passed through a delay element with a first order delay time constant T, to generate a delayed lateral acceleration signal $g_F$ (delayed cornering state signal) which is delayed with reference to the actual lateral acceleration g and which can be expressed as follows:

$$g_F = g\{1/(1+TS)\}$$

wherein S is a differential operator. The delayed lateral acceleration signal $g_F$ assumes a smaller value for a more rapid variation of the actual lateral acceleration g, so that the value of the delayed lateral acceleration signal $g_F$ can be used to judge the vehicle driving condition, i.e., whether the vehicle is under cornering or lane change.

In another step 35, a gain A corresponding to the delayed lateral acceleration signal $g_F$ is looked-up based on a table data which corresponds to FIG. 10. This gain A is used in a subsequent step 36 as a coefficient for the rear wheel steer-back amount $\Delta\delta_r$. Thus, with the objective of the present invention in view, the gain A is determined so that A=0 for a lane change ($g_F<g_{F1}$) in order to set the rear wheel steer-back amount $\Delta\delta_r$ zero, and the gain A gradually increases during a cornering of the vehicle ($g_F>g_{F1}$), along with an increased lateral acceleration $g_F$, and A=1.0 for the range $g_F>g_{F2}$.

The aimed rear wheel steering angle $\delta_r$ is determined at the step 36, using the formula $\delta_r=K_r\theta-\Delta\delta_r A$, and the actual rear wheel steering angle is controlled so as to coincide with the aimed rear wheel steering angle.

With such an arrangement of the rear wheel steering control system, during a lane change wherein the steering wheel is operated relatively rapidly, as shown in FIG. 11, the gain A is maintained zero. In the case of a conventional rear wheel steering control which does not use the gain A ($\delta_r=K_r\theta-\Delta\delta_r$), as mentioned above, the rear wheel steer-back amount $\Delta\delta_r$ is influential on the rear wheel steering angle $\delta_r$ to cause a temporary variation of the steering angle as shown by imaginary line in FIG. 11, which results in a degraded stability of the maneuverability of the vehicle during a lane change. Use of the gain A in the manner discussed above makes it possible to eliminate the temporary variation of the steering angle as shown by solid line in FIG. 11, to compensate for the otherwise degraded stability of the maneuverability of the vehicle during the lane change.

Figure 12:
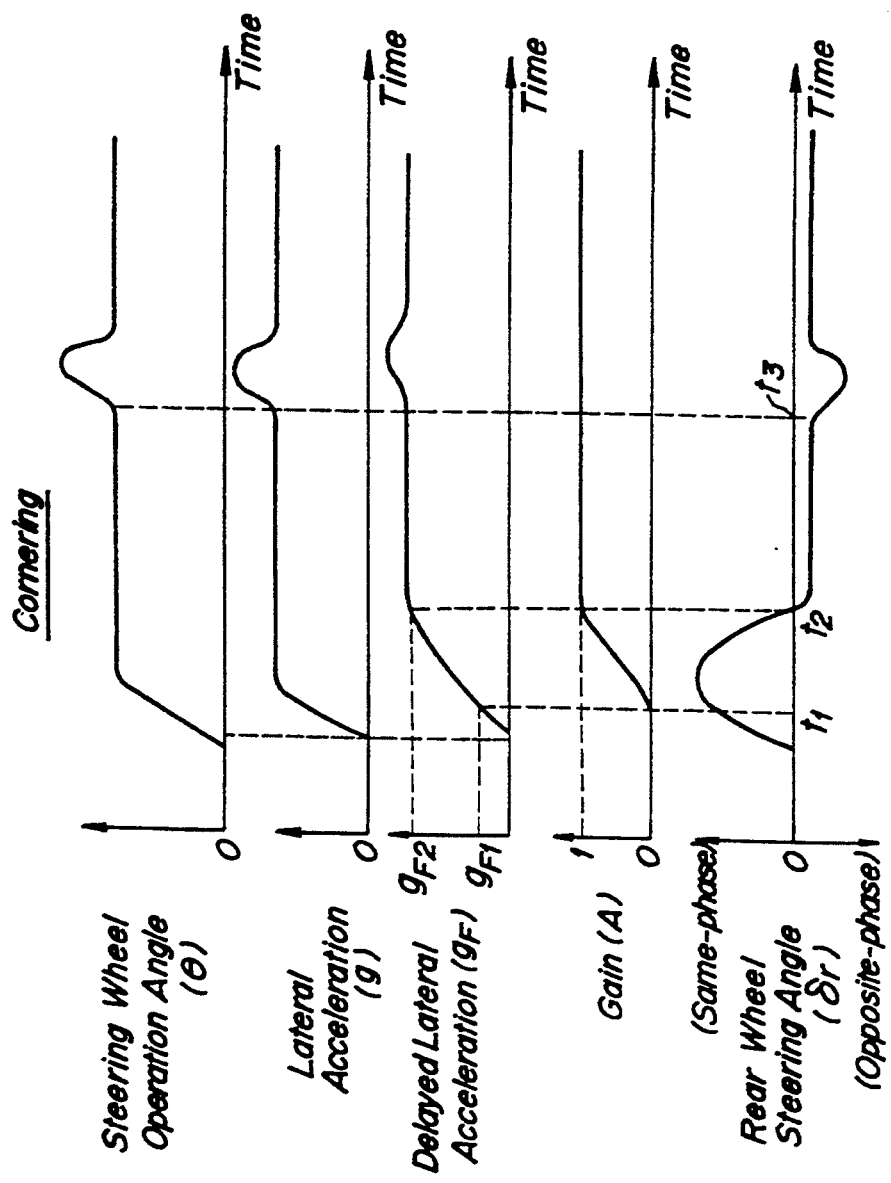
FIG. 12 is a time chart showing the function of the control in accordance with FIG. 9, as related to a relatively slow operation of the steering wheel.

On the other hand, during the cornering of the vehicle wherein the steering wheel is operated relatively slowly, as shown in FIG. 12, the gain A begins to be increased after a time point $t_1$ when $g_F>g_{F1}$, and A=1 after a time point $t_2$ when $g_F>g_{F2}$. Thus, after the time point $t_2$, the rear wheels are steered-back by an amount $\Delta\delta_r A$ in a direction in which the same-phase steering angle is reduced or the opposite-phase steering angle is increased, making it possible to mitigate the above-mentioned enhanced understeering tendency of front wheel drive type vehicles as desired. Further, when the steering wheel is subsequently once operated at a time point $t_3$ with an increased operation amount, the opposite-phase rear wheel steering angle is increased accordingly, to provide driving performances which are matched with the driver's manual steering wheel operation.

For vehicles of which the behavior is excessively sensitive to the steering wheel operation, however, it is of course that the rear wheel steering angle may be determined using the following formula:

$$\delta_r=K_r\theta-\Delta\delta_r A\{1/(1+\tau_1 S)\}$$

wherein $\tau_1$ is a first order delay time constant.

The cornering state of the vehicle may be judged from the steering wheel operation angle $\theta$, or the differential rotational speed $\Delta N$ between right and left driven wheels, instead of the lateral acceleration g as explained above. When the cornering state of the vehicle is judged from the steering wheel operation angle $\theta$, the delayed cornering state signal $\theta_F$ may be given as:

$$\theta_F=\theta 55\ 1/(1+TS)\}$$

with the gain A varied with reference to the delayed cornering state signal $\theta_F$ with a characteristic as shown in FIG. 13. Similarly, when the cornering state of the vehicle is judged from the differential rotational speed $\Delta N$, the delayed cornering state signal $\Delta N_F$ may be given as:

$$\Delta N_F=\Delta N\{1/(1+TS)\}$$

with the gain A varied with reference to the delayed cornering state signal $\Delta N_F$ with a characteristic as shown in FIG. 14.

It will be readily appreciated from the foregoing detailed description that the present invention provides an improved rear wheel steering control system, which is capable of satisfying both the characteristic demand for the lane change of the vehicle and that for the cornering of the vehicle on a compatible basis.

While the present invention has been so far explained with reference to certain preferred embodiments, it is of course that they were presented by way of examples only to show the manner how the invention may be carried out into practice, and various modifications and/or alterations may be made without departing from the scope of the invention as particularly defined in the appended claims.

We claim:

1. A rear wheel steering control system for automotive vehicles including front wheels, rear wheels, and a steering wheel which can be manually operated to steer the front wheels, said control system comprising:

means for steering the rear wheels in accordance with a steering wheel operation angle, and with a same-phase angle as the front wheels for a relatively small steering wheel operation angle, and with an opposite-phase angle to the front wheels for a relatively large steering wheel operation angle, said control system having a predetermined steering wheel operation angle range in which the steering angle of the rear wheels changes between a maximum same-phase steering angle and a maximum opposite-phase steering angle;

delayed response characteristic setting means operative in said predetermined steering wheel operation angle range, for setting a delayed response characteristic of the rear wheel steering, which is delayed with reference to a manual steering wheel operation:

means for steering the rear wheels with a same-phase angle as the front wheels for a relatively small steering wheel operation angle Within said predetermined steering wheel operation angle range;

means for steering-back an angle of the rear wheels within said predetermined steering wheel operation angle range, toward an opposite phase direction with reference to the front wheels:

detecting means for detecting a cornering state of the vehicle and generating an actual cornering state signal which is indicative of an actual cornering state of the vehicle;

delayed cornering state signal generating means connected to said detecting means and responsive to said actual cornering state signal, for generating a delayed cornering state signal which is delayed with reference to said actual cornering state signal; and rear wheel steer-back angle limiting means connected to said delay means and responsive to said delayed cornering state signal for limiting the steering-back angle of the rear wheels in accordance with said delayed cornering state signal.

2. The rear wheel steering control system as set forth in claim 1, wherein said cornering state detecting means is a lateral acceleration sensor, and said delayed cornering state signal generating means generates a delayed lateral acceleration signal as said delayed cornering state signal.

3. The rear wheel steering control system as set forth in claim 1, wherein said cornering state detecting means is a steering wheel operation angle sensor, and said delayed cornering state signal generating means generates a delayed steering wheel operation angle signal as said delayed cornering state signal.

4. The rear wheel steering control system as set forth in claim 1, wherein said cornering state detecting means is a differential rotational speed sensor for detecting a difference in rotational speeds of right and left driven wheels, and said delayed cornering state signal generating means generates a delayed differential rotational speed signal as said delayed cornering state signal.

5. A rear wheel steering control system for automotive vehicles including front wheels, rear wheels, and a steering wheel which can be manually operated to steer the front wheels, said control system comprising means for steering the rear wheels with a same-phase angle as the front wheels for a relatively small steering wheel operation angle in a predetermined operation range, and means for steering-back an angle of the rear wheels in said operation range, toward an opposite phase direction with reference to the front wheels, said control system further comprising:

detecting means for detecting a cornering state of the vehicle and generating an actual cornering state signal which is indicative of an actual cornering state of the vehicle;

delay means connected to said detecting means and responsive to said actual cornering state signal, for generating a delayed cornering state signal which is delayed with reference to said actual cornering state signal; and rear wheel steer-back angle limiting means connected to said delay means and responsive to said delayed cornering state signal, for limiting the steering-back angle of the rear wheels in accordance with said delayed cornering state signal.

6. The real wheel steering control system as set forth in claim 5, wherein said cornering state detecting means is a lateral acceleration sensor, and said delay means generates a delayed lateral acceleration signal as said delayed cornering state signal.

7. The rear wheel steering control system as set forth in claim 5, wherein said cornering state detecting means is a steering wheel operation angle sensor, and said delay means generates a delayed steering wheel operation angle signal as said delayed cornering state signal.

8. The rear wheel steering control system as set forth in claim 5, wherein said cornering state detecting means is a differential rotational speed sensor for detecting a difference in rotational speeds of right and left driven wheels, and said delay means generates a delayed differential rotational speed signal as said delayed cornering state signal.

9. The rear wheel steering control system as set forth in claim 5, wherein said control system comprises means for steering the rear wheels in accordance with a steering wheel operation angle, with a same-phase angle as the front wheels for a relatively small steering wheel operation angle, and with an opposite-phase angle to the front wheels for a relatively large steering wheel operation angle.

10. The rear wheel steering control system as set forth in claim 5, wherein said control system has a predetermined steering wheel operation angle range in which the steering angle of the rear wheels changes between a maximum same-phase steering angle and a maximum opposite-phase steering angle.

11. The rear wheel steering control system as set forth in claim 10, wherein said control system further comprises delay means operative in said steering wheel operation angle range, for setting a delayed response characteristic of the rear wheel steering, which is delayed with reference to a manual steering wheel operation.

12. The control system as set forth in claim 11, wherein said predetermined steering wheel operation angle range includes a first steering wheel operation angle range including a neutral position, in which the rear wheel steering angle, along with an increased steering wheel operation angle, increases in the direction of the same-phase angle with a gradient which is a proportional constant depending upon the steering wheel operation angle, and which is variable depending upon a vehicle speed.

13. The control system as set forth in claim 12, wherein said predetermined steering wheel operation angle range includes a second steering wheel operation angle range which is larger than the first steering wheel operation angle range in terms of the steering wheel operation angle, in which the rear wheel steering angle is maintained at the maximum same-phase angle.

14. The control system as set forth in claim 13, wherein said predetermined steering wheel operation angle range includes a third steering wheel operation angle range which is larger than the second steering wheel operation angle range in terms of the steering wheel operation angle, in which the rear wheel steering angle, along with an increased steering wheel operation angle, is reduced from the maximum same-phase angle toward the maximum opposite-phase angle.

15. The control system as set forth in claim 14, wherein said predetermined steering wheel operation angle range includes a fourth steering wheel operation angle range which is larger than the third steering wheel operation angle range in terms of the steering wheel operation angle, in which the rear wheel steering angle is maintained at the maximum opposite-phase angle.

16. The control system as set forth in claim 14, wherein said predetermined steering wheel operation angle range includes a predetermined steering wheel operation angle defining a boundary between the second and the third steering wheel operation angle ranges, said predetermined steering wheel operation angle being dependent upon the vehicle speed and decreases as the vehicle speed becomes higher.

* * * * *